US006398399B1

(12) United States Patent
Neophytou

(10) Patent No.: US 6,398,399 B1
(45) Date of Patent: Jun. 4, 2002

(54) FIBER OPTIC ROADWAY GUIDANCE APPARATUS AND SYSTEM

(76) Inventor: Stelios Neophytou, 4829 E. Georgia St., Burnaby, British Columbia (CA), V5C 2W1

( * ) Notice: Subject to any disclaimer, the term of this patent is extended or adjusted under 35 U.S.C. 154(b) by 0 days.

(21) Appl. No.: 09/570,537

(22) Filed: May 12, 2000

(51) Int. Cl.[7] .................................................. F21S 4/00
(52) U.S. Cl. ...................... 362/576; 362/153.1; 404/11
(58) Field of Search ............................... 362/153.1, 576, 362/153, 145; 404/11, 12

(56) References Cited

U.S. PATENT DOCUMENTS

| 2,093,642 A | * | 9/1937 | Nystuen ...................... 404/11 |
| 2,162,302 A | * | 6/1939 | Greene ....................... 362/620 |
| 3,996,556 A | | 12/1976 | Eigenmann |
| 4,080,085 A | | 3/1978 | Dickson |
| 4,570,207 A | | 2/1986 | Takahashi et al. |
| 5,839,816 A | | 11/1998 | Varga et al. ................. 340/907 |
| 6,072,407 A | * | 6/2000 | Shin ............................. 340/907 |
| 6,082,886 A | * | 7/2000 | Stanford ..................... 362/576 |

FOREIGN PATENT DOCUMENTS

| CA | 1288497 | 9/1991 |
| CA | 1297085 | 3/1992 |

* cited by examiner

*Primary Examiner*—Sandra O'Shea
*Assistant Examiner*—John Anthony Ward
(74) *Attorney, Agent, or Firm*—Oyen Wiggs Green & Mutala

(57) ABSTRACT

Currently, vehicle and pedestrian traffic on roadways is guided by lines painted on the asphalt or concrete, which are difficult to see at night or in rainy weather. The present invention provides an illuminated fiber optic guide path embedded in the surface of the roadway, which is selectively illuminated, such as in conjunction with traffic lights, to guide vehicles and pedestrians.

13 Claims, 4 Drawing Sheets

FIBER OPTIC ROADWAY GUIDANCE APPARATUS AND SYSTEM

TECHNICAL FIELD

The invention relates to roadway markings for regulating traffic and pedestrians, and more particularly to illuminated roadway markings.

BACKGROUND ART

Currently, vehicle and pedestrian traffic on roadways is guided by lines painted on the asphalt or concrete. Such lines may include reflective material, such as glass spheres embedded in the highway paint, or plastic reflectors embedded in the asphalt, to make them more visible at night. Such guiding lines include highway center lines, lane marking lines, lines delineating the roadway edge, and lines for pedestrian cross-walks, typically at intersections. Vehicle and pedestrian traffic at intersections is directed by traffic lights which are automatically controlled. However most traffic accidents still occur at intersections due to inattention to these signals.

Illuminated guides have long been used to assist airline pilots for landing on airport runways. For example, U.S. Pat. No. 2,332,362 issued Oct. 19, 1943 discloses a lamp used for runway marking. Illuminated markings have also been designed for highway marking. Typically such illuminated markings utilize discrete, discontinuous light sources powered by a battery or a pair of conductors. See for example U.S. Pat. No. 3,996,556 Eigenmann issued Dec. 7, 1976 and U.S. Pat. No. 4,080,085 Dickson issued Mar. 21, 1978. Such systems have not gained acceptance due to the expense of installing and maintaining such systems, nor has an effective guidance system for intersections been devised.

There is therefore a need for an illuminated traffic guidance system which guides vehicles and pedestrians at intersections and which is economic to install and maintain.

DISCLOSURE OF INVENTION

The present invention therefore provides a roadway illuminated guide path comprising a continuously illuminated fibre optic cable embedded in the surface of the roadway. The roadway guide path comprises a light source optically connected to the fibre optic cable. The invention further provides a system for guiding vehicular and pedestrian traffic at a controlled intersection of two roadways, each roadway forming left turn and forward lanes in each direction, the system comprising: a) illuminated guide paths for left turn and forward lanes in each direction of each roadway through the intersection; and b) control means for selectively illuminating the illuminated guide paths to signal the desired flow of traffic through the intersection.

BRIEF DESCRIPTION OF DRAWINGS

In drawings which disclose a preferred embodiment of the invention.

BEST MODE(S) FOR CARRYING OUT THE INVENTION

Figure 1:
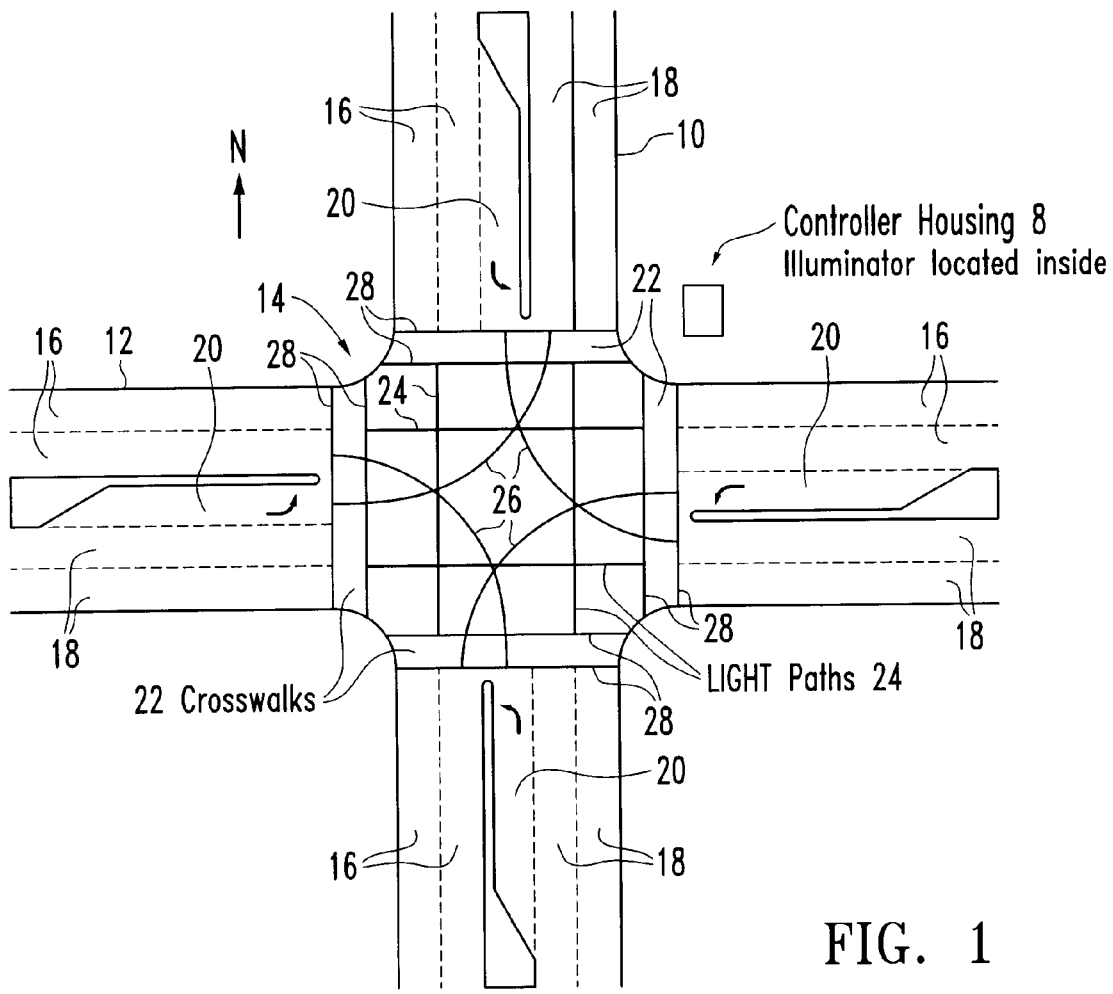
FIG. 1 is a plan view of a traffic intersection marked according to the invention.

With reference to FIG. 1, north-south roadway 10 and east-west roadway 12 intersect at intersection 14. Each roadway has forward lanes 16, 18 and left turn lanes 20. Pedestrian cross-walks are provided at 22. According to the present invention, continuous illuminated light paths are provided in intersection 14 for forward traffic at 24, for left turn traffic at 26 and for cross-walks at 28. A controller 8 controls the illumination of the light paths in conjunction with the overhead traffic signals (not shown), and provides the light source for the light paths.

Figure 4A:
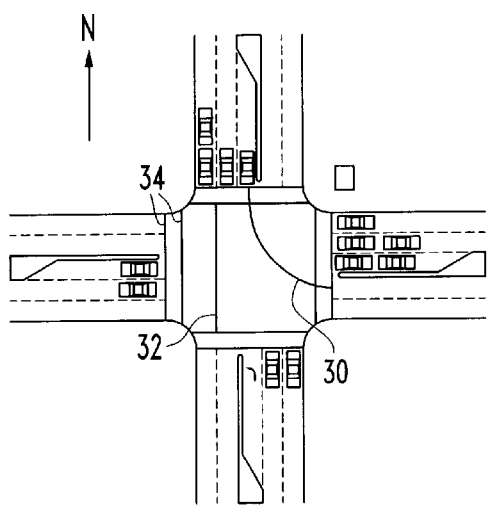
FIGS. 4A–4D are plan views illustrating the operation of the intersection shown in FIG. 1.
Figure 4B:
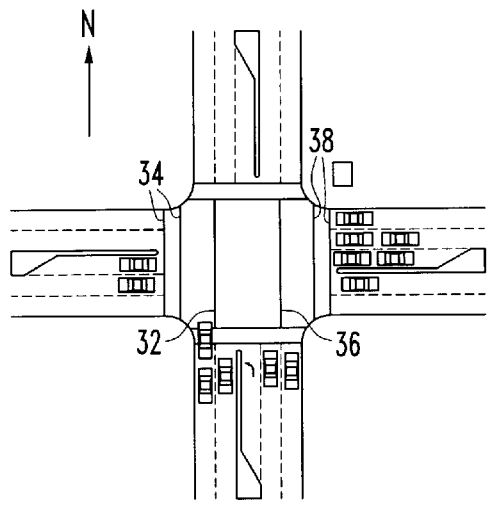
Figure 4C:
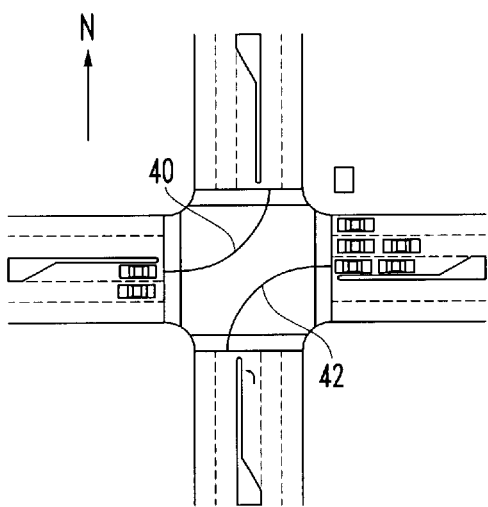
Figure 4D:
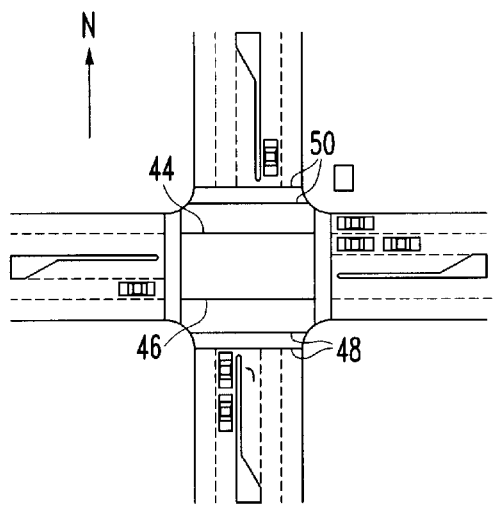

In operation, FIG. 4A illustrates an initial advanced green signal for southbound traffic. Southbound left turn light path 30 is illuminated as is forward southbound light path 32 and the westerly north-south pedestrian crossing 34. The other light paths are not illuminated. In FIG. 4B the advanced green signal is over and north-south forward light paths 32, 36 are illuminated as are north-south pedestrian crosswalk light paths 34, 38. FIG. 4C illustrates an initial advanced green signal for east and westbound traffic. East and westbound left turn light paths 40, 42 are illuminated. The other light paths are not illuminated. In FIG. 4D the east-west advanced green signal is over and east-west forward light paths 44, 46 are illuminated as are east-west pedestrian cross-walk light paths 48, 50.

Figure 3:
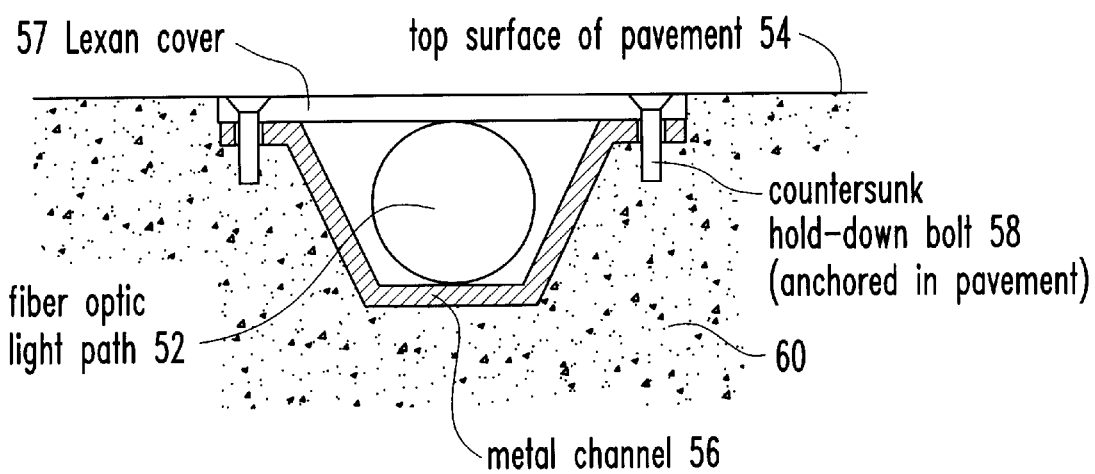
FIG. 3 is a cross-section taken along lines A—A of FIG. 1.

Preferably light paths 24, 26, 28 are formed of continuous light-emitting fibre optic cable 52 (see FIG. 3) which radiates light radially along its entire length. Such cable is referred to as "side-emitting" or "side-lit", such as that manufactured by Intelite Inc., or the L.E.F.™ Linear Emitting Fiber manufactured by Lumenyte International Corporation. Such cable may be constructed with an opaque covering over the lower portion of the cable and light-transmitting only on the upper portion. Light is provided to the cable 52 from a halogen source (not shown) located at or near the controller 8. Cable 52 can be recessed below the surface 54 of the roadway in a metal or plastic channel 56. Channel 56 may be formed of other rigid material, or may simply be formed as a groove in the surface of the asphalt. Preferably a transparent, durable plastic cover 57, made from a material such as LEXANT™, is secured to the channel 56 by countersunk bolts 58 which anchor the channel 56 to the asphalt or concrete pavement 60. If the fiber optic cable is simply secured in a groove cut in the asphalt, the invention can function without a protective cover.

The color of the light applied to cable 52 can be used to assist the direction of traffic. For example the light paths may be green when first illuminated concurrently with the green traffic light, and may turn yellow when the corresponding traffic light turns yellow to warn the traffic of the upcoming signal change. The light paths may also be highlighted by blinking or intermittent color changes.

While a continuous fiber optic light path is preferred, discrete point sources of light from end-lit fiber optic cable can also be used to form the light path in that case the light path can provide an indication of the direction of travel by consecutively illuminating the light points in sequence in the direction of travel.

Figure 2:
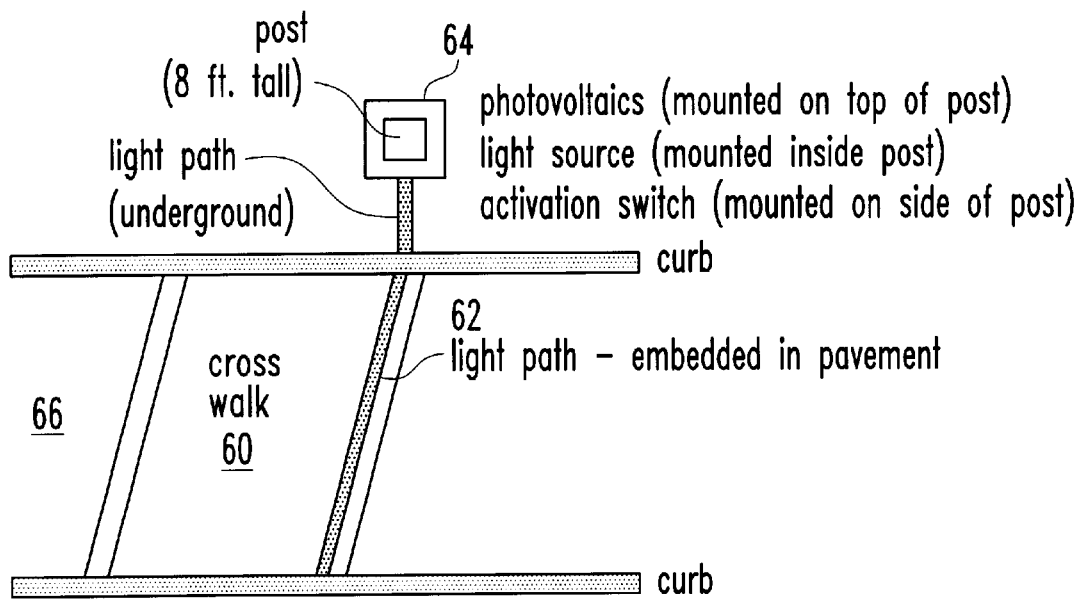
FIG. 2 is a plan view of a pedestrian cross-walk marked according to the invention.

An advantage of the present system over current traffic lights is that drivers are more prone to look downwards toward the pavement than upwards towards overhead traffic lights. The light paths according to the invention may also be used to guide vehicles in other dangerous or confusing situations apart from intersections, such as highway curves, lane merges and the like. Also, as indicated in FIG. 2, the guide paths may be used on an individual cross-walk 60 in conjunction with a dedicated controller 64 so that a pedestrian can initiate a stop signal, and illuminate the guide path 62, when a pedestrian desires to cross the road 66.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for guiding vehicular or pedestrian traffic along a desired path of travel at a controlled intersection of two roadways to conform to a pre-determined flow of traffic, each roadway comprising a roadway surface adapted for carrying traffic, said system comprising:

a) illuminated guide paths formed in said roadway surfaces for each roadway through said intersection;

b) control means for selectively illuminating said illuminated guide paths to indicate said desired path of travel of said traffic according to said pre-determined flow of traffic through said intersection;

wherein each said illuminated guide path comprises a light-emitting line in said roadway surface which is adapted to be selectively illuminated or extinguished by said control means to provide an indication when illuminated of said desired path of travel.

2. The system of claim 1 wherein at least one of said two roadways carries traffic in two opposing directions and wherein said illuminated guide paths are formed in said roadway surfaces for each said opposing direction of each roadway through said intersection.

3. The system of claim 1 wherein at least one of said two roadways carries traffic in two opposing directions and has a left turn and forward lanes in at least one of said opposing directions and wherein said illuminated guide paths are formed in said roadway surfaces for each said left turn and forward lanes through said intersection.

4. The system of claim 1 wherein said two roadways each carry traffic in two opposing directions and have left turn and forward lanes in each of said opposing directions, and wherein said illuminated guide paths are formed in said roadway surfaces for each said left turn and forward lanes in each said opposing direction of each roadway through said intersection.

5. The system of claim 1 wherein said light-emitting line in said roadway surface comprises a side-lit fiber optic cable embedded in said roadway surface generally parallel to the upper surface of said roadway surface, and a light source optically connected to said fiber optic cable, said fiber optic cable being thereby adapted to emit illumination radially along a continuous length of said fiber optic cable which illumination is thereby visible above said roadway surface.

6. The system of claim 5 wherein said fiber optic cable is recessed below said upper surface of said roadway surface.

7. The system of claim 6 wherein said fiber optic cable is embedded in an upwardly opening channel in said roadway surface.

8. The system of claim 5 wherein said fiber optic cable is embedded in a groove in said roadway surface.

9. The system of claim 5 wherein said light source is adapted to provide light in a plurality of colors.

10. The system of claim 1 wherein said light emitting line in said roadway surface comprises a linear array of discrete light sources.

11. The system of claim 10 wherein said linear array of discrete light sources is illuminated in linear sequence in a desired direction of travel when said light-emitting line is illuminated.

12. The system of claim 11 further comprising traffic lights for controlling said intersection, wherein said illuminated guide paths are selectively illuminated in synchronization with said traffic lights.

13. The system of claim 12 wherein said light-emitting lines are adapted to be selectively illuminated in a sequence of colors, the color of each said light-emitting lines, when illuminated, being synchronized with the corresponding traffic light.

* * * * *